US012559049B2

(12) United States Patent
    Wada et al.

(10) Patent No.: US 12,559,049 B2
(45) Date of Patent: Feb. 24, 2026

(54) ELECTRIC JUNCTION BOX AND MANUFACTURING METHOD

(71) Applicant: YAZAKI CORPORATION, Tokyo (JP)

(72) Inventors: Masahiro Wada, Makinohara (JP); Takaaki Kakimi, Makinohara (JP); Kazuki Shoji, Makinohara (JP); Kengo Aono, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 369 days.

(21) Appl. No.: 18/336,951

(22) Filed: Jun. 16, 2023

(65) Prior Publication Data

US 2024/0010140 A1 Jan. 11, 2024

(30) Foreign Application Priority Data

Jul. 11, 2022 (JP) ................................. 2022-111252

(51) Int. Cl.
    *B60R 16/023*     (2006.01)
    *H02G 3/08*      (2006.01)
    *H02G 3/14*      (2006.01)
    *H02G 3/16*      (2006.01)

(52) U.S. Cl.
    CPC ......... *B60R 16/0238* (2013.01); *H02G 3/081* (2013.01); *H02G 3/14* (2013.01); *H02G 3/16* (2013.01)

(58) Field of Classification Search
    CPC ........... B60R 16/0238; B60R 16/0239; H02G 3/081; H02G 3/14; H02G 3/16; H02G 3/086
    USPC ....................................................... 439/76.2
    See application file for complete search history.

(56) References Cited

FOREIGN PATENT DOCUMENTS

| CN | 110854770 | * | 8/2021 | ......... B60R 16/0215 |
|----|-----------|---|--------|------------------------|
| JP | 2015-79652 A | | 4/2015 | |
| JP | 2015-80342 A | | 4/2015 | |
| JP | 2021114803 | * | 8/2021 | ............... H02G 3/16 |

* cited by examiner

*Primary Examiner* — Tulsidas C Patel
*Assistant Examiner* — Jeffrey Mountain
(74) *Attorney, Agent, or Firm* — KENEALY VAIDYA LLP

(57) ABSTRACT

An electric junction box includes a conductive member including a relief terminal portion, a holding member configured to hold the conductive member, a resin body having an accommodation space for accommodating the holding member, and a cover pivotally supported by the holding member and covering the relief terminal portion. The resin body includes a locked portion configured to, by locking with a locking portion of the cover, prevent displacement of the cover from a closed position where the relief terminal portion is covered to an open position where the relief terminal portion is not covered.

5 Claims, 9 Drawing Sheets

ELECTRIC JUNCTION BOX AND MANUFACTURING METHOD

CROSS-REFERENCE TO RELATED APPLICATIONS

This application is based on and claims priority under 35 USC 119 from Japanese Patent Application No. 2022-111252 filed on Jul. 11, 2022, the entire content of which is incorporated herein by reference.

TECHNICAL FIELD

The present invention relates to an electric junction box and a manufacturing method.

BACKGROUND ART

In the related art, there has been proposed an electric junction box that is mounted on a vehicle and accommodates therein various electronic components such as a fuse, a relay, and an electronic control unit in an accommodation space. For example, an electric junction box in the related art includes a relief terminal to which a booster cable is connected when a battery of a vehicle is exhausted (for example, see Patent Literatures 1 and 2).

CITATION LIST

Patent Literature

Patent Literature 1: JP2015-79652A
Patent Literature 2: JP2015-80342A

SUMMARY OF INVENTION

In some cases, it is not necessary to provide a relief terminal in an electric junction box depending on specifications such as a vehicle type. Therefore, in the related art, bus bars, blocks for holding the bus bars, and the like are manufactured in accordance with specifications. By manufacturing bus bars and blocks having various shapes in accordance with the specifications, manufacturing cost of the electric junction box is increased.

Further, in some of the electric junction boxes in the related art, a relief terminal is provided integrally with a bus bar, and the relief terminal may be provided even in a vehicle type in which the relief terminal is not necessarily mounted. Therefore, a frame may be provided with a shape for protecting the relief terminal so that the relief terminal is not used. Accordingly, the frame is required to have a complicated shape, and therefore, a mold for manufacturing the frame may be complicated.

The present invention has been made in view of the above circumstances, and an object of the present invention is to provide a manufacturing method and an electric junction box capable of protecting a relief terminal portion with a simple structure when it is not necessary to provide a relief terminal while reducing manufacturing cost.

In order to achieve the object described above, an electric junction box according to the present invention is characterized as follows.

An electric junction box of the present invention includes a conductive member including a relief terminal portion, a holding member configured to hold the conductive member, a resin body having an accommodation space for accommodating the holding member, and a cover pivotally supported by the holding member and covering the relief terminal portion. The resin body includes a locked portion configured to, by locking with a locking portion of the cover, prevent displacement of the cover from a closed position where the relief terminal portion is covered to an open position where the relief terminal portion is not covered Further, in order to achieve the object described above, a manufacturing method of an electrical junction box according to the present invention is characterized as follows.

The electric junction box includes a conductive member having a relief terminal portion, a holding member configured to hold the conductive member, a resin body having an accommodation space for accommodating the holding member, a first cover pivotally supported by the holding member and having a locking portion, and a second cover pivotally supported by the holding member and not having a locking portion. The resin body includes a locked portion configured to, by locking with the locking portion of the first cover, prevent displacement of the first cover from a closed position where the relief terminal portion is covered to an open position where the relief terminal portion is not covered. The manufacturing method includes a step of pivotally supporting the first cover or the second cover on the holding member in accordance with an object on which the electric junction box is mounted.

An electric junction box and a manufacturing method according to the present invention will be described below.

According to the electric junction box and the manufacturing method of the present configuration, a locking portion of a cover (a first cover) is locked to a locked portion of a resin body, so that displacement of the cover (the first cover) from a closed position to an open position is prevented. Accordingly, the relief terminal portion can be protected with the simple structure as described above for the electric junction box in which the relief terminal is not necessarily provided. On the other hand, the cover (second cover) that is not provided with the locking portion may be used for an electric junction box in which the relief terminal is provided. In addition, with such a simple structure, a mold having a complicated shape is not required, and the manufacturing cost can be reduced.

The present invention has been briefly described above. Further, details of the present invention will be further clarified by reading through a mode for carrying out the invention described below (hereinafter referred to as an "embodiment") with reference to the accompanying drawings.

DESCRIPTION OF EMBODIMENTS

Embodiment

Hereinafter, an electric junction box 1 according to an embodiment of the present invention shown in FIGS. 1 to 3 will be described with reference to the drawings. The electric junction box 1 is typically a relay box that is mounted on a vehicle and has an accommodation space S that accommodates electronic components (not shown), which are electronic components such as relays or other components.

Hereinafter, for convenience of description, as shown in FIGS. 1 to 9, "front", "rear", "left", "right", "upper", and "lower" are defined. A "front-rear direction", a "left-right direction", and an "upper-lower direction" are orthogonal to one another. When the electric junction box 1 is mounted on a vehicle, the "front-rear direction", the "left-right direction", and the "upper-lower direction" respectively correspond to a front-rear direction, a left-right direction, and an upper-lower direction of the vehicle.

Figure 1:
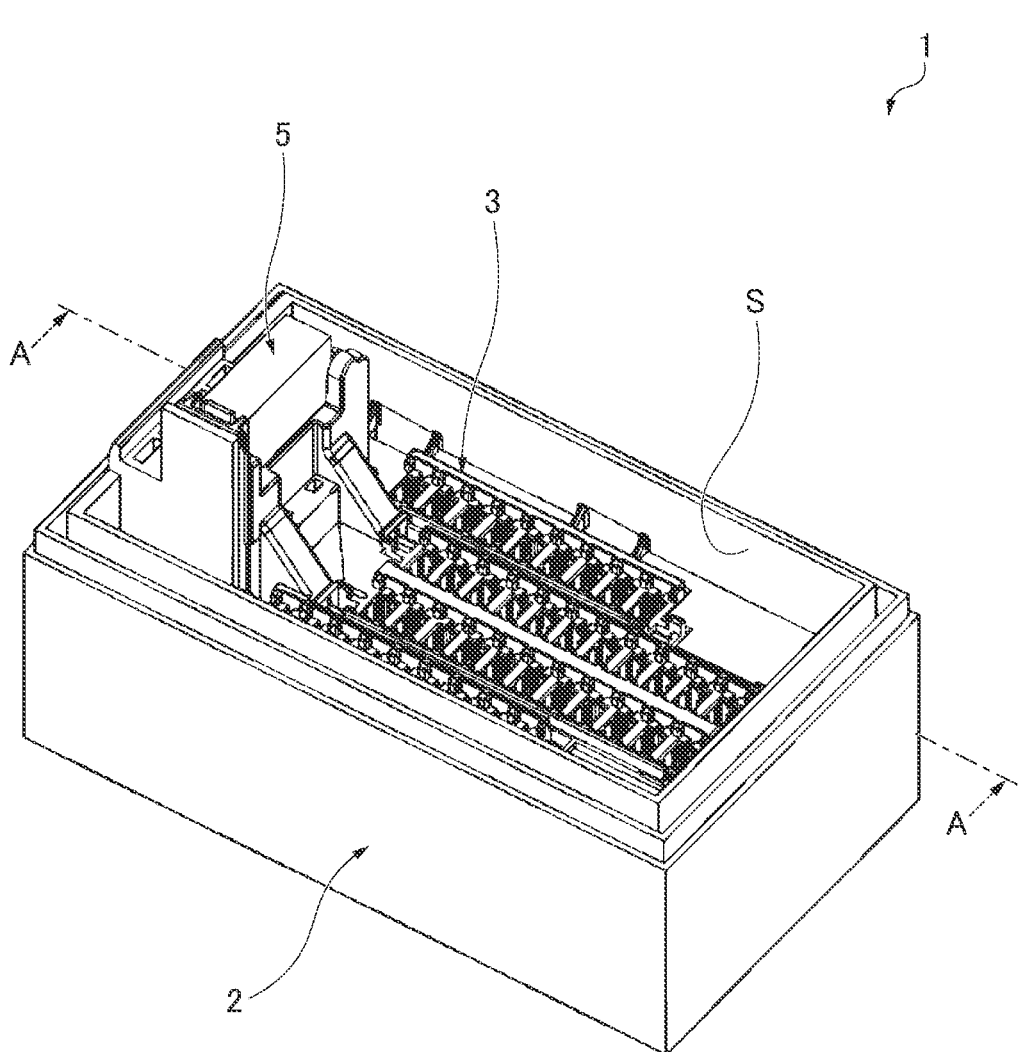
FIG. 1 is a front perspective view of an electric junction box according to an embodiment of the present invention (an upper cover and a lower cover are not shown)
Figure 1:
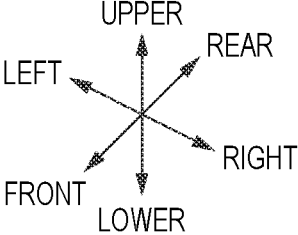
Figure 2:
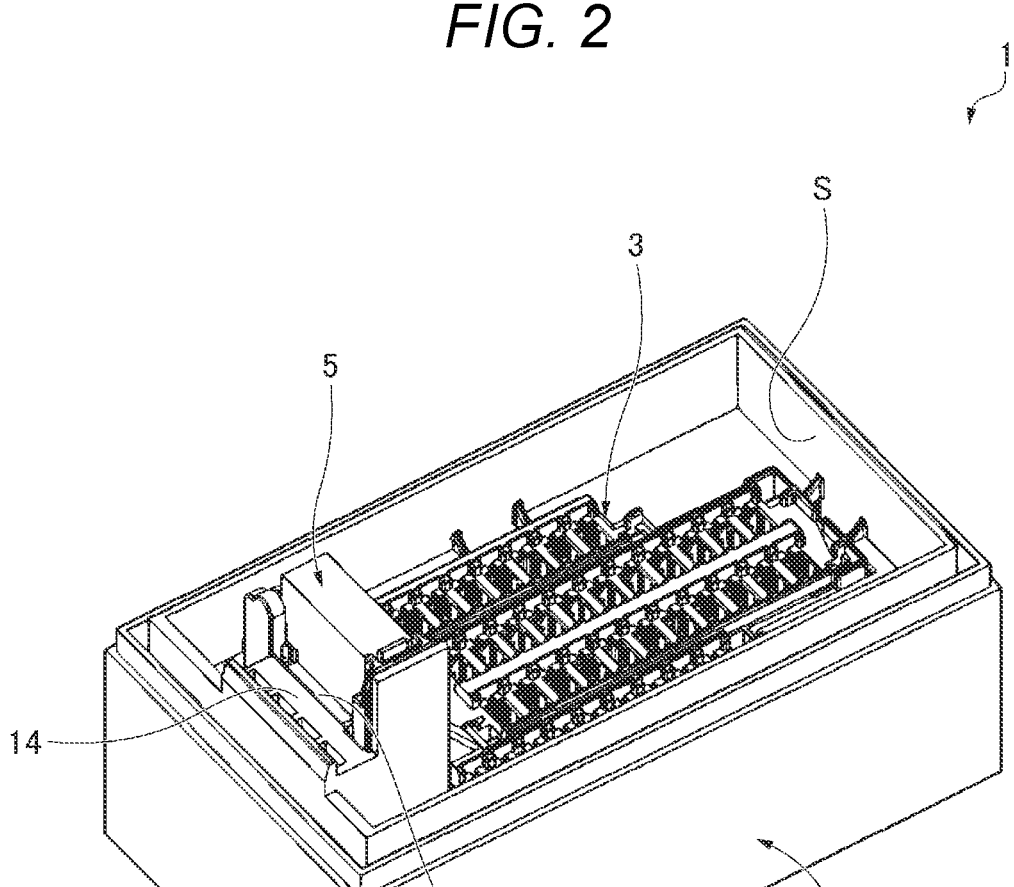
FIG. 2 is a rear perspective view of the electric junction box shown in FIG. 1.
Figure 2:
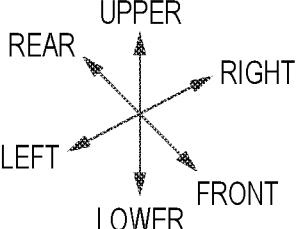
Figure 3:
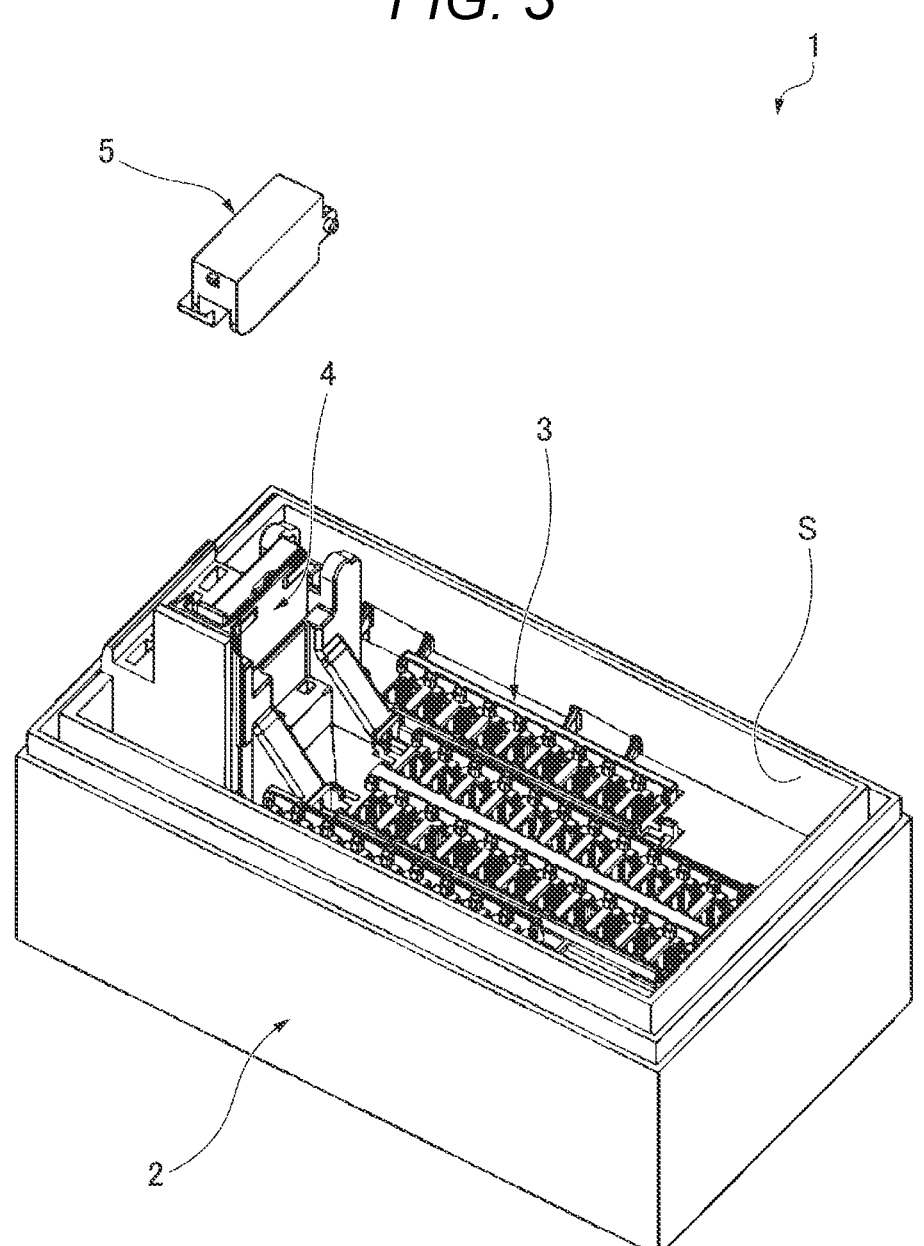
FIG. 3 is a main part exploded perspective view of the electric junction box shown in FIG. 1.
Figure 3:
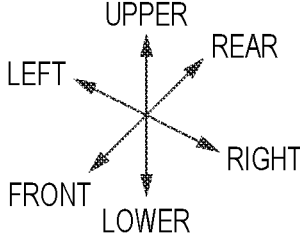

As shown in FIGS. 1 to 3, the electric junction box 1 includes a frame 2 (corresponding to a "resin body" of the present invention), a block 3 (corresponding to a "holding member" of the present invention), a bus bar (corresponding to a "conductive member" of the present invention), and a cover 5 (corresponding to a "first cover" of the present invention). Further, the electric junction box 1 includes an upper cover (not shown) assembled above the frame 2 so as to close an upper end opening of the frame 2, and a lower cover (not shown) assembled below the frame 2 so as to close a lower end opening of the frame 2.

The frame 2, the block 3, the bus bar 4, the cover 5, the upper cover, and the lower cover constitute the electric junction box 1. Hereinafter, the frame 2, the block 3, the bus bar 4, and the cover 5 constituting the electric junction box 1 will be described in order.

Figure 4:
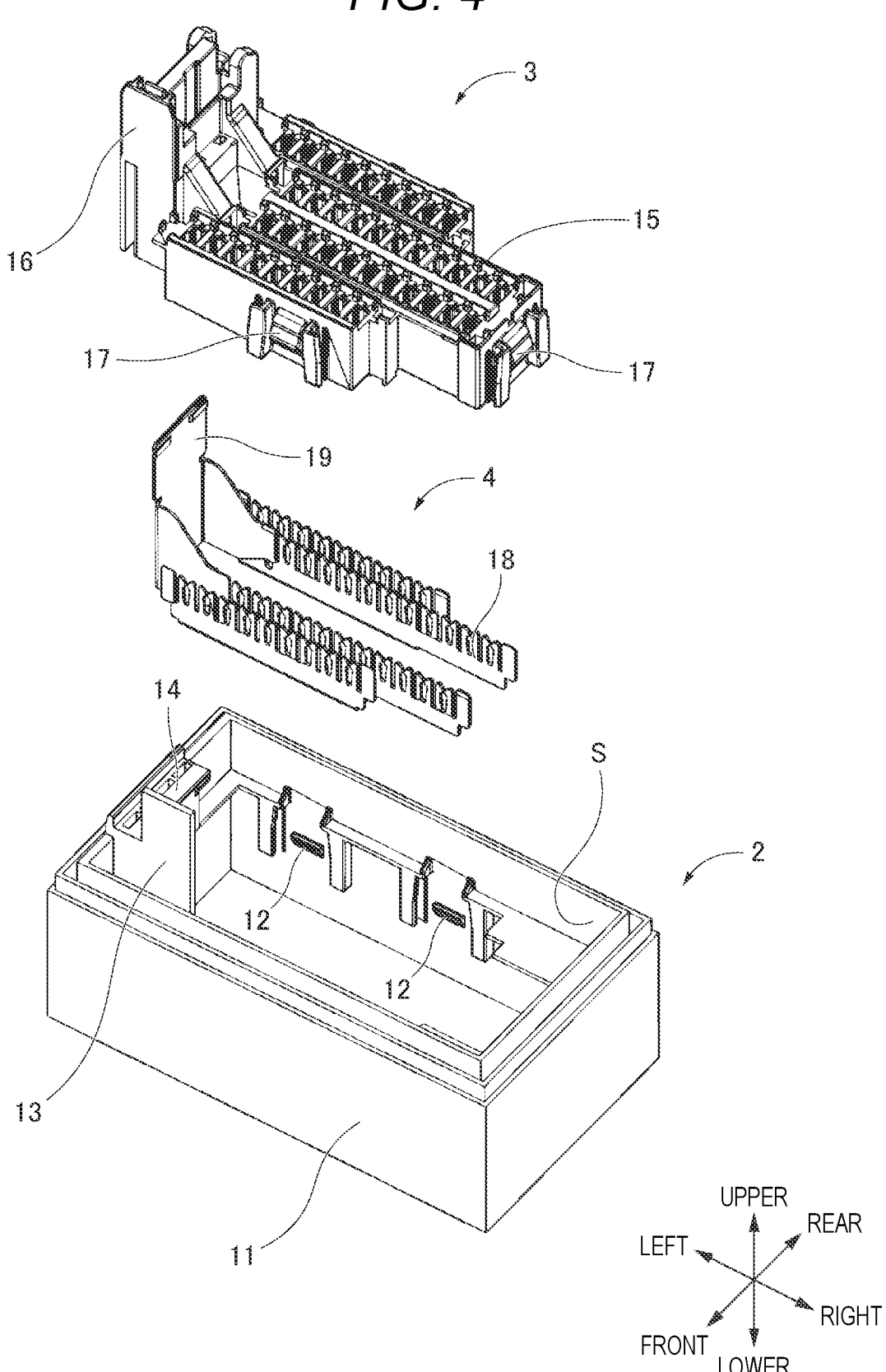
FIG. 4 is an exploded perspective view of a frame, a block, and a bus bar.

First, the frame 2 will be described. As shown in FIG. 4, the frame 2 includes a substantially rectangular tubular side wall portion 11 extending in the upper-lower direction. The side wall portion 11 constitutes a major part of an external appearance for a side face of the electric junction box 1. In the frame 2, an accommodation space S is defined by the side wall portion 11, and the accommodation space S has a function of accommodating the block 3.

Locking portions 12 each including a guide portion and a protruding portion are provided at a plurality of positions (four positions in this example) on an inner surface of the side wall portion 11. The locking portions 12 have a function of assembling the block 3 to the frame 2 in the accommodation space S.

In the accommodation space S of the frame 2, a relief terminal accommodating portion 13 for accommodating a relief terminal portion 19 of the bus bar 4 and a relief terminal holding portion 16 of the block 3, which will be described later, is provided integrally with the left side wall portion 11.

The relief terminal accommodating portion 13 is provided with a locked portion 14 to which a locking portion 25 of the cover 5 described later is locked. When locked by the locking portion 25 of the cover 5 (see FIGS. 7 and 8), the locked portion 14 has a function of preventing or restricting displacement of the cover 5 (that is, rotation of the cover 5) from a closed position (see FIGS. 1 to 2) where the relief terminal portion 19 is covered to an open position (not shown) where the relief terminal portion 19 is not covered.

Next, the block 3 will be described. As shown in FIG. 4, in the block 3, a body portion 15 having a plurality of component holding portions (reference numerals are omitted) and the relief terminal holding portion 16 disposed on a left side of the body portion 15 are integrally configured.

The body portion 15 has a function of holding a body portion 18 of the bus bar 4 and a function of holding an electronic component (not shown) mounted in the electric junction box 1. The relief terminal holding portion 16 has a function of holding the relief terminal portion 19 of the bus bar 4 and a function of pivotally supporting a cover 6 to be described later and the cover 5 covering the relief terminal portion 19.

Locked portions 17 each including a guide portion and a protruding portion are provided at a plurality of positions (four positions in this example) on an outer surface of the block 3 so as to correspond to the locking portions 12 of the frame 2.

Next, the bus bar 4 will be described. As shown in FIG. 4, in the bus bar 4, a body portion 18 having a plurality of component connecting portions (reference numerals are omitted) and the relief terminal portion 19 disposed on the left side of the body portion 18 are integrally configured. The relief terminal portion 19 has a function as a connection portion with a booster cable to be connected when a battery of the vehicle on which the electric junction box 1 is mounted is exhausted. The bus bar 4 is accommodated in the accommodation space S of the frame 2 after being assembled and held in the block 3 (see FIGS. 1 to 3).

Figure 5:
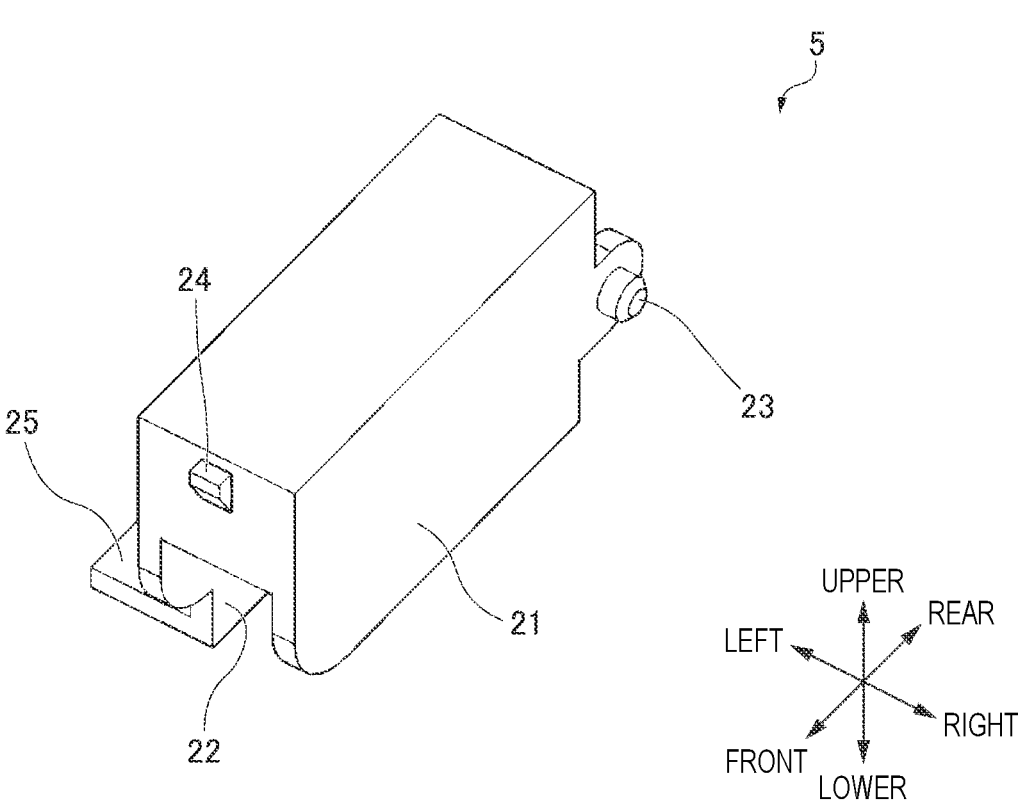
FIG. 5 is a front perspective view of a cover.
Figure 6:
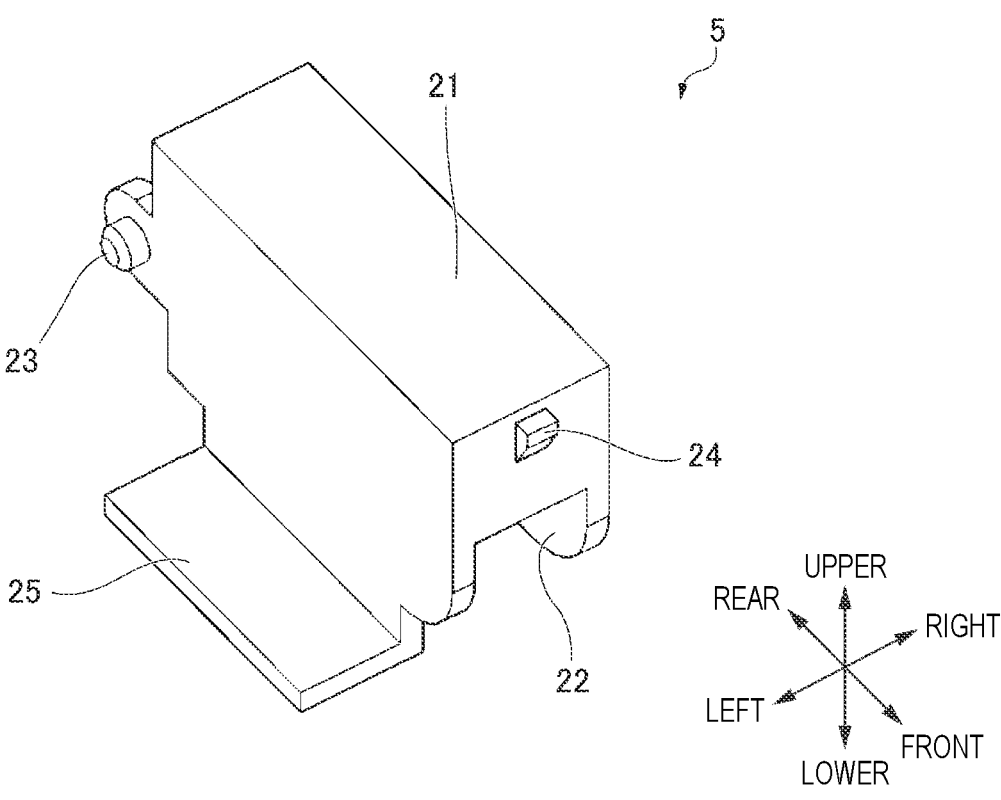
FIG. 6 is a rear perspective view of the cover.
Figure 7:
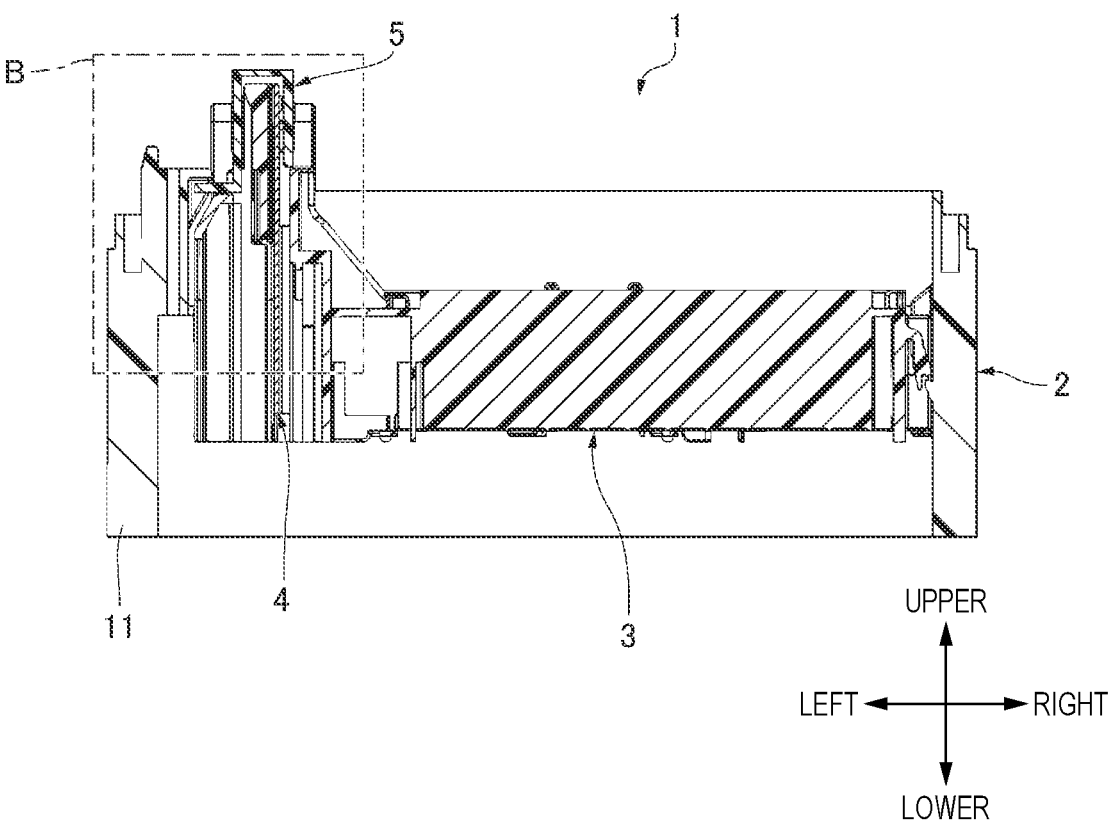
FIG. 7 is a cross-sectional view taken along line A-A in FIG. 1.
Figure 8:
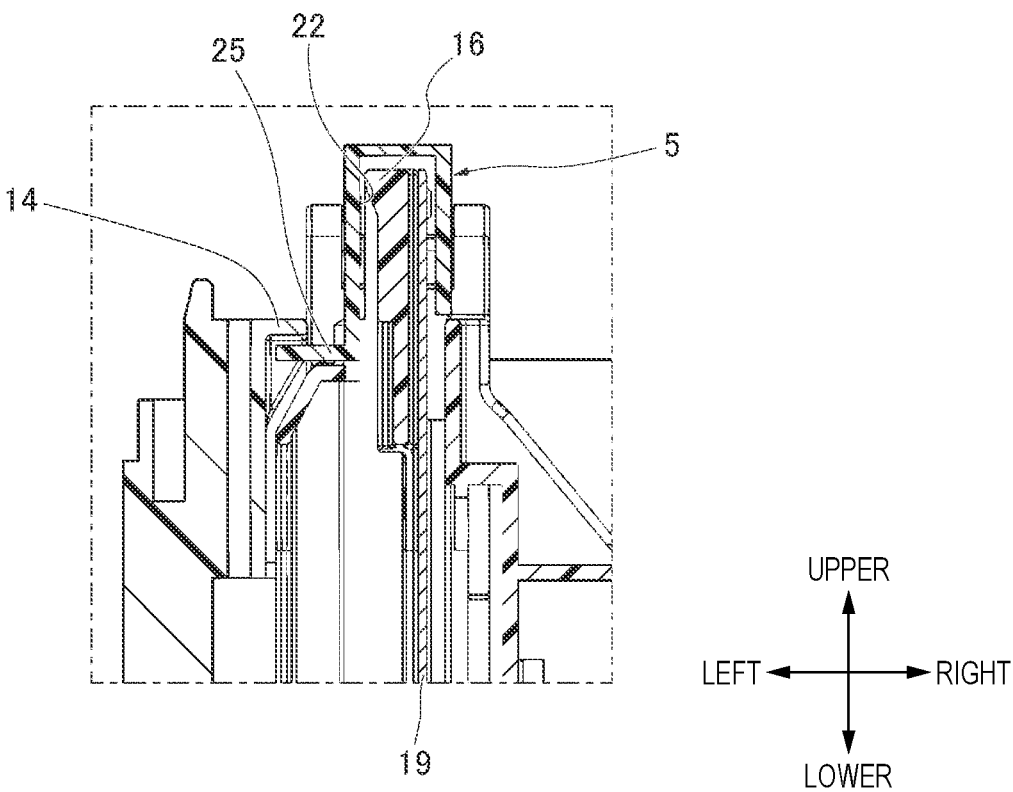
FIG. 8 is an enlarged view of a part B in FIG. 7.
Figure 9:
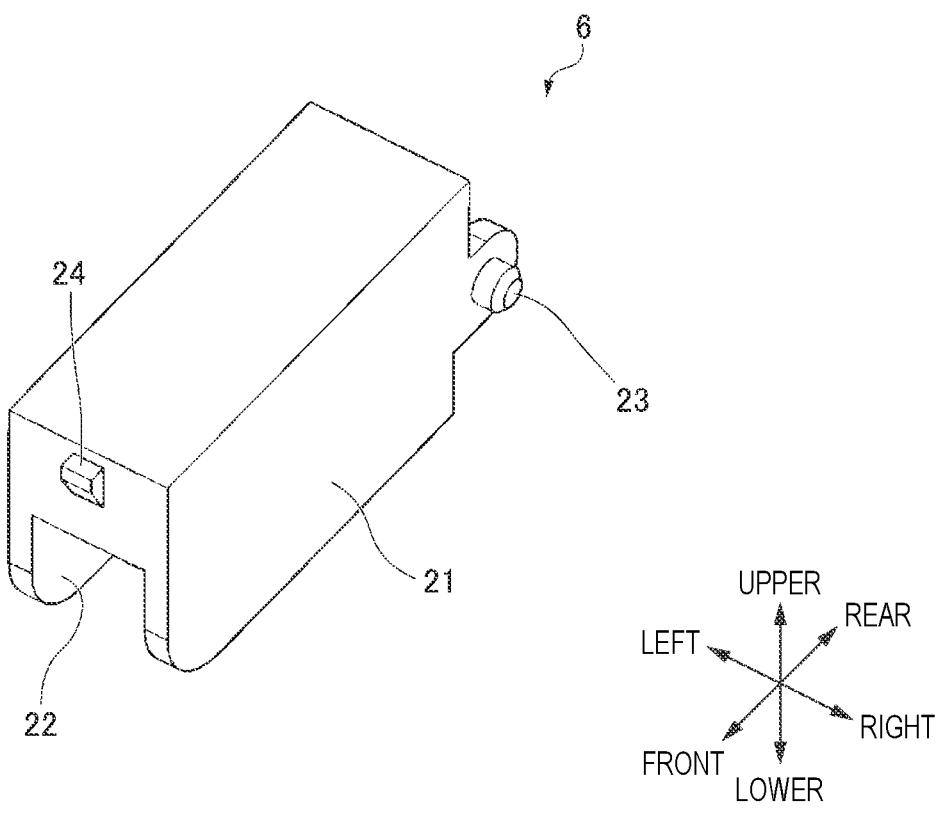
FIG. 9 is a front perspective view showing the cover without a locking portion.

Next, the cover 5 will be described. As shown in FIGS. 5 and 6, the cover 5 includes a body portion 21 having a substantially rectangular columnar shape. A groove portion 22 recessed upward is provided in a lower end surface of the body portion 21. When the cover 5 is at the closed position, an upper end portion of the relief terminal portion 19 is disposed in the groove portion 22 (see FIGS. 7 to 8).

A shaft portion 23 pivotally supported by a bearing (not shown) of the relief terminal holding portion 16 provided in the block 3 is provided at a rear end portion of the body portion 21. The cover 5 according to the present embodiment is configured so as not to rotate by the locking portion 25 being locked to the locked portion 14 of the frame 2, and the pivot support of the shaft portion 23 by the bearing of the block 3 is a rotatable pivot support, as generally known.

A locking protruding portion 24 to be locked to a locking recessed portion (not shown) of the relief terminal holding portion 16 provided in the block 3 is provided at a front end portion of the main body portion 21. The locking protruding portion 24 has a function of restricting the cover 5 from being easily rotated, that is, from being opened, when the cover 5 is at the closed position.

At a lower end of a left end portion of the body portion 21, the locking portion 25 protruding leftward and extending in the front-rear direction is provided corresponding to the locked portion 14 of the frame 2. When being locked to the locked portion 14 of the frame 2 (see FIGS. 7 and 8), the locking portion 25 has a function of preventing or restricting displacement of the cover 5 (that is, rotation of the cover 5) from the closed position to the open position.

The frame 2, the block 3, the bus bar 4, and the cover 5 constituting the electric junction box 1 have been described above. In order to obtain the electric junction box 1 shown in FIGS. 1 and 2, after the bus bar 4 is assembled to the block 3, the block 3 holding the bus bar 4 is assembled to the frame 2, the cover 5 is pivotally supported by the relief terminal holding portion 16 of the block 3, and the locking portion 25 of the cover 5 is locked to the locked portion 14 of the frame

5

2. Then, by assembling the upper cover and the lower cover to the frame 2, the electric junction box 1 is completed. The order of manufacturing the electric junction box 1 is not limited to this. The frame 2, the block 3, and the bus bar 4 may be integrally configured.

An above-described manufacturing method of the electric junction box 1 has been described with respect to an example in which a relief terminal is not necessarily provided in a vehicle. On the other hand, when it is necessary to provide the relief terminal in the vehicle, the cover 6 (corresponding to the "second cover" of the present invention, see FIG. 9) may be used instead of the cover 5, and the cover 6 is pivotally support by the relief terminal holding portion 16 of the block 3. The only difference between the cover 5 and the cover 6 is that the cover 6 is not provided with the locking portion 25.

As described above, the cover 5 is used when it is not necessary to provide the relief terminal in the vehicle in which the electric junction box 1 is mounted, and the cover 6 is used when it is necessary to provide the relief terminal. In other words, the cover 5 or the cover 6 may be selected according to the specifications of the vehicle, and the cover 5 or the cover 6 is pivotally supported by the relief terminal holding portion 16 of the block 3.

Operations and Effects

According to the electric junction box 1 of the present embodiment, the locking portion 25 of the cover 5 is locked to the locked portion 14 of the frame 2, so that the rotation of the cover 5 is prevented. Accordingly, the relief terminal portion 19 can be protected with the simple structure as described above for the electric junction box 1 in which the relief terminal is not necessarily provided. On the other hand, the cover 6 that is not provided with the locking portion 25 may be used for an electric junction box in which the relief terminal is provided. In addition, with such a simple structure, a mold having a complicated shape is not required, and the manufacturing cost can be reduced.

Further, according to the electric junction box 1 of the present embodiment, it is possible to cope with the necessity of the relief terminal by changing between the covers 5 and 6, so that the frame 2, the block 3, and the bus bar 4 can be standardized, and the manufacturing cost can be reduced compared to an electric junction box in the related art. Further, in manufacturing work of a case where it is not necessary to provide the relief terminal, the locking portion 25 of the cover 5 may be simply locked to the locked portion 14 of the frame 2 without requiring complicated work, so that workability is excellent compared to an electric junction box in the related art.

Other Embodiments

It should be noted that the present disclosure is not limited to the above embodiment, and modifications, improvements, and the like can be made as appropriate. In addition, materials, shapes, dimensions, numbers, arrangement positions, and the like of the respective constituent elements in the above embodiment are optionally selected and are not limited as long as the present invention can be implemented.

Here, characteristics of the embodiment of the electric junction box and the manufacturing method according to the present invention described above will be briefly summarized and listed in [1] and [2] below.

[1] An electric junction box (1) including:
    a conductive member (bus bar 4) including a relief terminal portion (19);
    a holding member (block 3) configured to hold the conductive member (bus bar 4);
    a resin body (frame 2) having an accommodation space (S) for accommodating the holding member (block 3); and
    a cover (5) pivotally supported by the holding member (block 3) and covering the relief terminal portion (19),
    wherein the resin body (frame 2) includes a locked portion (14) configured to, by locking by a locking portion (25) of the cover (5), prevent displacement of the cover (5) from a closed position where the relief terminal portion (19) is covered to an open position where the relief terminal portion (19) is not covered.
[2] A manufacturing method of an electric junction box (1),
    the electric junction box (1) including
    a conductive member (bus bar 4) including a relief terminal portion (19),
    a holding member (block 3) configured to hold the conductive member (bus bar 4),
    a resin body (frame 2) having an accommodation space (S) for accommodating the holding member (block 3),
    a first cover (5) pivotally supported by the holding member (block 3) and having a locking portion (25), and
    a second cover (6) pivotally supported by the holding member (block 3) and not having a locking portion (25),
    in which the resin body (frame 2) includes a locked portion (14) configured to, by locking by the locking portion (25) of the first cover (5), prevent displacement of the first cover (5) from a closed position where the relief terminal portion (19) is covered to an open position where the relief terminal portion (19) is not covered,
    the manufacturing method including:
    a step of pivotally supporting the first cover (5) or the second cover (6) on the holding member (3) in accordance with an object on which the electric junction box (1) is mounted.

According to the electric junction box having the configuration of [1], the locking portion of the cover is locked to the locked portion of the resin body, so that the displacement of the cover from the closed position to the open position is prevented. Accordingly, the relief terminal portion can be protected with the simple structure as described above for the electric junction box in which the relief terminal is not necessarily provided. In addition, with such a simple structure, a mold having a complicated shape is not required, and the manufacturing cost can be reduced.

According to the manufacturing method having the configuration of [2], the locking portion of the first cover is locked to the locked portion of the resin body, so that the displacement of the first cover from the closed position to the open position is prevented. Accordingly, the relief terminal portion can be protected with the simple structure as described above for the electric junction box in which the relief terminal is not necessarily provided. On the other hand, the cover that is not provided with the locking portion may be used for an electric junction box in which the relief terminal is provided. In addition, with such a simple structure, a mold having a complicated shape is not required, and the manufacturing cost can be reduced.

What is claimed is:

1. An electric junction box comprising:

a conductive member including a relief terminal portion;

a holding member configured to hold the conductive member;

a resin body having an accommodation space for accommodating the holding member; and a cover supported by the holding member and covering the relief terminal portion, the cover includes a locking portion, wherein the resin body includes a locked portion that locks with the locking portion of the cover to prevent displacement of the cover from a closed position where the relief terminal portion is covered to an open position where the relief terminal portion is not covered.

2. A manufacturing method of an electric junction box, the electric junction box including a conductive member including a relief terminal portion, a holding member configured to hold the conductive member, and a resin body having an accommodation space for accommodating the holding member, the manufacturing method comprising:

selecting one cover from a plurality of covers in accordance with an object on which the electric junction box is mounted, the plurality of covers include a first cover having a locking portion, and a second cover not having a locking portion;

locking a locked portion with the locking portion of the first cover to prevent displacement of the first cover from a closed position where the relief terminal portion is covered to an open position where the relief terminal portion is not covered if the one cover is the first cover; and mounting the one cover on the holding member such that the one cover is supported by the holding member to pivot between the closed position and the opened position, if the one cover is the second cover.

3. The electric junction box according to claim 1, wherein the cover includes a lock protruding portion that is spaced away from the locking portion, and the lock protruding portion engages the holding member when the cover is in the closed position and restricts rotation of the cover out of the closed position.

4. The electric junction box according to claim 3, wherein the cover includes a first wall, a second wall spaced away from the first wall in a first direction, and a third wall connected to and extending from each of the first wall and the second wall, the locking portion of the cover protrudes from the third wall in a second direction that intersects the first direction and extends along the third wall, and the lock protruding portion is connected on and protrudes from the second wall.

5. The electric junction box according to claim 3, wherein the cover further includes a shaft portion connected on the first wall, and the shaft is pivotally supported on the resin body.

* * * * *